United States Patent
Jüptner

[19]

[11] Patent Number: 6,135,037
[45] Date of Patent: Oct. 24, 2000

[54] LIFTING MECHANISM FOR A SEEDING MACHINE ROW CLEANER

[75] Inventor: Detlef Jüptner, Schönenberg-Kübelberg, Germany

[73] Assignee: Deere & Company, Moline, Ill.

[21] Appl. No.: 09/354,034

[22] Filed: Jul. 15, 1999

[30] Foreign Application Priority Data

Aug. 17, 1998 [DE] Germany .................. 198 37 272

[51] Int. Cl.$^7$ ................................. A01B 49/04
[52] U.S. Cl. ................ 111/139; 111/157; 111/143; 172/624.5
[58] Field of Search .................. 111/139, 140, 111/143, 144, 147, 149–162, 62, 85, 200, 52; 172/624.5, 604

[56] References Cited

U.S. PATENT DOCUMENTS

| | | | |
|---|---|---|---|
| 3,705,560 | 12/1972 | Lappin | 111/85 |
| 4,208,974 | 6/1980 | Dreyer et al. | 111/85 |
| 4,422,392 | 12/1983 | Dreyer et al. | 111/52 |
| 4,726,303 | 2/1988 | Degelman et al. | 111/52 |
| 5,341,754 | 8/1994 | Winterton . | |
| 5,357,883 | 10/1994 | Depault | 111/118 |
| 5,394,946 | 3/1995 | Clifton et al. | 111/140 X |
| 5,727,638 | 3/1998 | Wodrich et al. . | |
| 5,878,678 | 3/1999 | Stephens et al. . | |

*Primary Examiner*—Robert E Pezzuto

[57] ABSTRACT

A suspension for a row cleaner associated with a furrow opener in a seeding machine includes a lifting mechanism to lift the row cleaner when the furrow opener is lifted. The lifting mechanism includes a bell crank having an input crank arm coupled to the furrow opener by a fist linkage to rotate the bell crank when the furrow opener is lifted. An output crank arm of the bell crank is coupled to the row cleaner by a second linkage to lift the row cleaner when the bell crank shaft is rotated by lifting of the furrow opener. The second linkage is flexible, such as a rope, to enable the row cleaner to lift to avoid obstacles without back driving the bell crank to also lift the furrow opener. The flexible second linkage also enables the row cleaner to be equipped with a lock to retain the row cleaner in a raised position for use of the seeding machine in conditions not requiring a row cleaner.

14 Claims, 2 Drawing Sheets

LIFTING MECHANISM FOR A SEEDING MACHINE ROW CLEANER

BACKGROUND OF THE INVENTION

1. Field of the Invention

The present invention relates to a seeding machine and in particular to a lifting mechanism for a row cleaner that lifts the row cleaner upon lifting of an associated furrow opener.

2. Description of the Prior Art

U.S. Pat. No. 5,341,754 discloses a grain drill assembly with several grain drills spaced along a transverse support. Each grain drill contains a furrow opener that forms a furrow for the deposit of seed. Each furrow opener is attached to the transverse support to pivot vertically. A row cleaner is located ahead of the furrow opener and is mounted to the transverse support through a parallelogram linkage to pivot vertically. The row cleaner is forced against the ground by means of a spring.

U.S. Pat. No. 5,878,678 discloses that the row cleaner be attached to the furrow opener so that the latter carries the row cleaner. While it is advantageous to lift the row cleaner when the furrow opener is raised, with the arrangement shown in the '678 patent, the row cleaner is not raised to the same degree as the furrow opener. This is particularly disadvantageous during operation on the road. In addition, the row cleaner always engages the ground when the furrow opener is in the lowered position. There is no ability to operate the furrow opener without using the row cleaner. When seeding in a prepared seedbed, the row cleaner is not needed.

SUMMARY OF THE INVENTION

It is an object of the present invention to provide a row cleaner in a seeding machine that is raised upon the lifting of the furrow opener.

It is an advantage of the present invention that the row cleaner is lifted as high as or higher than the furrow opener, thereby avoiding the danger that it will impact the ground during transport.

It is a further object of the invention to provide a row cleaner that can remain in a raised position when the furrow opener is lowered to an operative position during use of the seeding machine when the row cleaner is not needed.

The term "seeding machine" is used herein to refer to any type of seed planting machine having a furrow opener and row cleaner. This includes, but is not limited to, grain drills, planters and air seeders. The invention is shown and described in the context of a grain drill but is not limited for use solely within grain drills.

The seeding machine of the present invention includes a lifting mechanism for the row cleaner that includes a rotating shaft on the machine frame. Input and output crank arms, or levers, are coupled to the shaft forming a bell crank. The input crank arm is connected by a first linkage to the support arm of the furrow opener. When the furrow opener is raised, the shaft of the bell crank is rotated. The output crank arm of the lifting mechanism is coupled to the row cleaner by a second linkage. Thus, when the shaft of the bell crank is rotated, the output crank arm lifts the row cleaner. The term "linkage" may include any form of mechanical connection and may also include a fluid column in a hydraulic circuit or an electrical system.

The second linkage connecting the output crank arm to the row cleaner is preferably a flexible linkage that is only capable of transmitting a tensile load, such as, a strut, a rope, a chain, a telescoping linkage and the like. This allows the row cleaner to move upward at any time and evade an obstacle or excessively hard ground without causing the lifting mechanism to lift the furrow opener. The second linkage is also preferably of an excess length to allow the furrow opener to rise a short distance before the row cleaner begins to lift.

If the row cleaner is forced toward the ground by means of a spring, the lifting mechanism provides the assurance that the effect of the spring in the vertical direction of the row cleaner is eliminated.

By dimensioning the length of the input and output crank arms differently, or by a differing arrangement of the linkages at the input and output crank arms, lever ratios of any choice can be generated. Differing connecting joint locations can also be provided, so that conformity to differing operating conditions is easily possible. The possibility of orienting the input and the output crank arms in differing directions with respect to each other also permits the accommodation of differing gravity forces, differing linkage stiffness and differently configured seeding machines.

If the row cleaner is coupled to the support arm of the furrow opener by means of a parallelogram linkage, then the row cleaner does not change its inclination relative to the ground and always applies the same insertion force. In addition an optimum position can be selected in which straw is cut reliably ahead of the row cleaner.

The row cleaners can be retained in a raised position by providing a lock on the linkage mounting the row cleaner, such as a parallelogram linkage. If at least one steering arm of the linkage can be blocked by a lock, for example at the support arm of the row cleaner, then the row cleaner can be retained in an upper position during the operation of the grain drill in which it remains out of operation. This is important in conditions when there is no furrow to open or during operation of the grain drill in preparation of a seedbed where the formation of grooves in the seedbed is to be avoided. The lock may be a latch, a hook, a chain, etc. A remotely operated lock is preferred since then the operator need not descend from the towing vehicle in order to disable the operation of the row cleaner and to lock a multitude of row cleaners, if required.

The bell crank lifting mechanism of the present invention is uncomplicated, low in cost and able to withstand the rough operation in agriculture. The pivot bearing arrangement for the rotating shaft of the lifting mechanism can be configured simply. The input and output crank arms may extend in the same direction or in opposite directions.

On seeding machines with multiple furrow openers and row cleaners, the lifting mechanism preferably has a single shaft with only one input crank arm and only one first linkage. Multiple output crank arms and second linkages are provided to lift the multiple row cleaners. This results in a considerable cost reduction.

DETAILED DESCRIPTION OF THE PREFERRED EMBODIMENT

Figure 1:
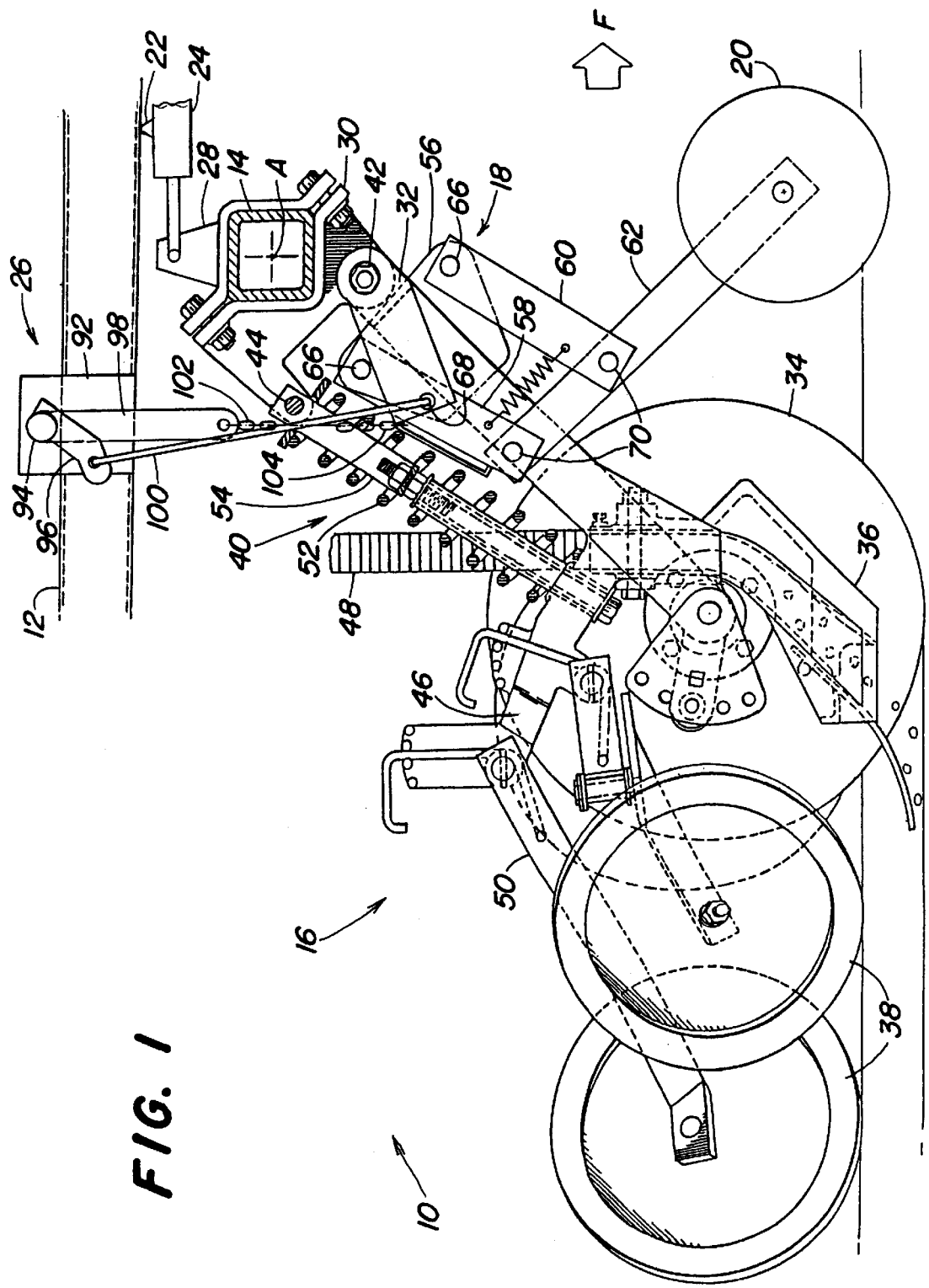
FIG. 1 shows a side view of a section of a grain drill assembly with a row cleaner mounted according to the invention.

A grain drill assembly 10 is used to apply seed and can be used in prepared ground as well as ground that has not been tilled. The grain drill assembly contains a frame 12, a support or rockshaft 14, at least one grain drill 16 and at least one suspension 18 for a row cleaner 20. For the sake of simplicity, the further description is based on only a single grain drill and therefore with only one suspension 18 and one row cleaner 20. Normally there are several such units, for example, 6, 10, 12 or more.

The frame 12, shown only in sections, is usually supported on the ground by wheels, not shown. The frame 12 is moved across a field by means of a towbar or towing arrangement, also not shown, by a towing vehicle, in particular an agricultural tractor, again not shown. At least one seed hopper, not shown, may be located on the frame 12. On the frame 12, in the immediate vicinity of the rockshaft 14, a bearing 22 is provided for a servomotor 24, such as a hydraulic cylinder. The servomotor is connected to an arm 28 rigidly connected to the rockshaft 14. A lifting mechanism 26 associated with the suspension 18 is located on the frame 12.

The rockshaft 14 is configured as a four-sided tube and is attached in bearings, not shown, to the underside of the frame 12 so as to pivot about a pivot axis A transverse to a forward direction of operation shown by the arrow F. Conventionally, the rockshaft 14 extends over the width of the frame 12 and can support a multitude of grain drills 16, fixed against rotation.

The grain drill 16 contains an attaching mount 30, a support arm 32, a furrow opener 34, a seed boot 36, closing wheels 38 and a pressure arrangement 40. U.S. Pat. No. 5,727,638 reveals a corresponding grain drill 16.

The attaching mount 30 is configured as a clamp and is fastened to the rockshaft 14, and is fixed against rotation. The attaching mount 30 has a two-piece configuration and can be clamped to the rockshaft 14 at any desired location. The portion of the mount 30 that is trailing in the direction of operation is provided with a support arm bearing 42, a pressure arrangement bearing 44 and an arm 67 with an aperture 68.

The support arm 32 extends from the rear lower to the front upper region and is retained with its leading end region in the support arm bearing 42 at the attaching mount 30 so as to freely pivot about a horizontal axis. The furrow opener 34 is free to rotate on the end of the support arm 32, in the opposite lower region. Between the two end regions, a strut 46 branches off to the rear.

The furrow opener 34 is configured as a disk that penetrates the ground at a small inclination to the direction of operation, and thereby forms a furrow for the deposit of the seed. Depending on the condition of the ground or upon encountering an obstacle, the furrow opener 34, with the support arm 32, can deflect upward about the support arm bearing 42.

The seed boot 36 is located in the region of the shadow of the furrow opener 34 and is rigidly connected to the support arm 32 so as to remain below the surface of the ground. On its input side, the seed boot 36 is connected to a tube 48 so as to receive seed from the seed hopper.

The closing wheels 38 are connected to the strut 46 by means of a retainer 50 so that they can pivot vertically and are spring loaded. The closing wheels are configured as disks and are inclined in such a way that during operation across the field they push earth from both sides into the furrow and thereby close the latter.

The pressure arrangement 40 contains a spring 52 that is concentric about a travel limiter 54. At one end, the travel limiter 54 engages the attaching mount 30, in particular the pressure bearing 44, and at the other end, the strut 46. In a conventional manner the spring 52 forces the strut 45, and thus the support arm 32, downward so that the furrow opener 34 penetrates into the ground and forms a furrow.

The row cleaner suspension 18 contains a retainer 56, first and second steering arms 58, 60, a row cleaner support arm 62, a lock 64 (shown only in FIGS. 2 and 3), and the lifting mechanism 26.

The retainer 56 is configured as a trapezoidal-shaped plate and is clamped to the support arm 32 by means of U-shaped brackets, not shown. In the projecting corner regions of the plate, the retainer 56 is provided with bearings 66 that support the steering arms 58, 60 so that they can pivot about a horizontal axes defined by the bearings 66. The steering arms 58 and 60 extend generally parallel to each other and are generally of the same length. The steering arms 58, 60 are connected in joints in the bearings 66 toward the front, in the direction of operation, where they can pivot. The steering arms 58, 60 contain rear bearings 70 through which they are connected to the row cleaner support arm 62 where they also pivot about horizontal axes. The spacing and the inclination of the center points of the bearings 66 or 70 are equal, resulting in a parallelogram linkage. A known spring, not described in any further detail, extends between the steering arms 58 and 60 and is used to force the row cleaner 20 against the ground. At its end region facing away from the steering arms 58, 60, the row cleaner support arm 62 supports the row cleaner 20, free to rotate. A suspension 18 of this type has already been described in the previously mentioned U.S. Pat. No. 5,878,678.

Figure 2:
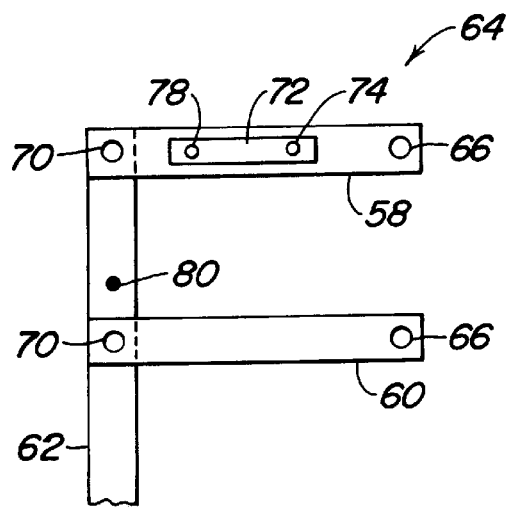
FIG. 2 shows a side view of a lock for holding the row cleaner in a raised position.
Figure 3:
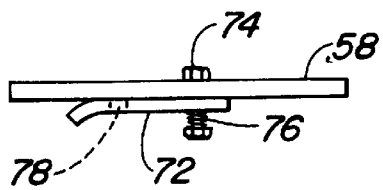
FIG. 3 shows a plan view of the lock shown in FIG. 2.
Figure 4:
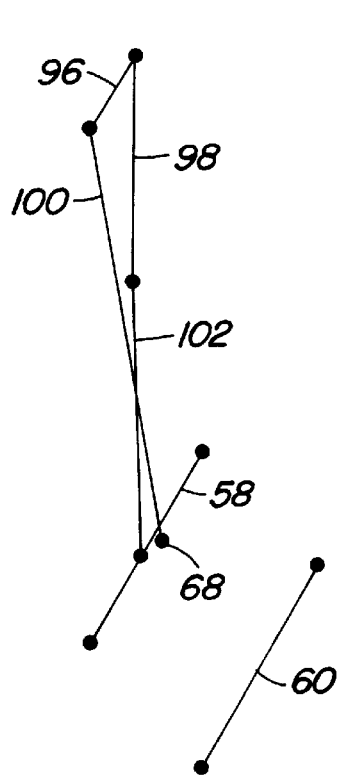
FIG. 4 shows a schematic illustration of the row cleaner mounting in an operating position.
Figure 5:
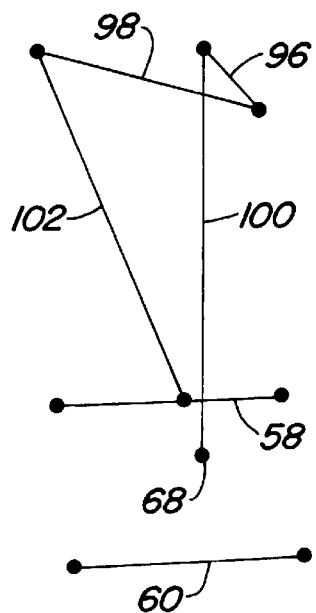
FIG. 5 shows a schematic illustration of the row cleaner mounting in a transport position.

The lock 64, FIGS. 2 and 3, contains a simple angled bracket 72, that is pivotally retained on the upper steering arm 58 by means of a screw 74. The bracket 72 is held in contact with the outer surface of the steering arm 58 by means of a compression spring 76 between the head of the screw 74 and the bracket 72. The bracket 72 is provided with an aperture 78 at a distance from the screw 74. A pin 80 is provided on the row cleaner support arm 62 that can be accommodated in the aperture 78 when the parallelogram linkage takes a position in which the steering arm 58 and the row cleaner support arm 62 approach each other, or the parallelogram linkage is collapsed. This occurs when the row cleaner is raised.

The bearing 22 and the arm 28 are each configured in such a way that they can accommodate the servomotor 24. The servomotor 24 is operated hydraulically from the towing vehicle and pivots the rockshaft 14 together with the attaching mount 30 in the clockwise or the counterclockwise direction about the axis A as seen in the drawing. This raises or lowers the grain drill 16 and the row cleaner 20.

The lifting mechanism 26 contains a mount 92, a shaft 94, an input crank arm 96, an output crank arm 98, a first linkage 100 and a second linkage 102. The lifting mechanism 26 is used to move the row cleaner 20 sufficiently far from the ground when the grain drill 16 is raised. The mount 92 is fastened to the frame 12 and contains a bearing, not described in any further detail, for the shaft 94. The shaft 94 is accommodated in the mount 92 and is free to pivot about a horizontal axis extending transverse to the direction of operation.

The input crank arm 96 is configured as a lever that is fixed to the shaft 94 in a manner to prevent rotation relative to the shaft, such as by welding. The output crank arm 98 is also configured as a lever and is connected in the same way to the shaft 94. The shaft and the input and output crank arms form a bell crank mechanism.

In order to attain a large lifting movement of the parallelogram linkage of the row cleaner 20, despite the small distance to the support arm bearing 42, the input crank arm 96 is considerably shorter than the output crank arm 98. The longitudinal axes of the input crank arm 96 and the output crank arm 98 extend at an angle of approximately 45° to each other. In the preferred embodiment, when the furrow opener 34 and the row cleaner 20 are positioned on the ground, the longitudinal axis of the output crank arm 98 extends almost vertically downward from the shaft 94.

The first linkage 100 is configured as a rod and extends between the arm 67 of the attaching mount 30 and the end of the input crank arm 96 facing, opposite from the shaft 94 and is there supported in a bearing, being free to pivot vertically. The second linkage 102 is flexible, in particular configured as a rope, and extends between the end of the output crank arm 98 opposite from the shaft 94, and a connecting joint 104 located approximately in the middle of the first steering arm 58.

If a grain drill assembly 10 is equipped with several grain drills 16, then it is advantageous that only one shaft 94, only one input crank arm 96 and only one first linkage 100 be provided, which are loaded from a single attaching mount 30. This shaft 94 then extends across all grain drills 16 and is provided with a corresponding number of output crank arms 98, each of which leads by a sufficient number of second linkages 102 to the first steering arm 58 of the parallelogram linkages located in each case below it. In this way the number of component parts can be decreased and cost can be reduced. Nevertheless it would also be possible to provide a shaft 94, input crank arm 96 and first linkage 100 for each grain drill 16.

The suspension 18 according to the invention operates as follows. In the operating position of the grain drill assembly 10 the servomotor 24 is extended and the rockshaft 14 is pivoted counterclockwise about the pivot axis A. In this position the furrow opener 34 and the row cleaner 20 penetrate at least to a small degree into the ground. Due to the flexible configuration of the second linkage 102, the row cleaner 20 can deflect upward with the steering arms 58, 60 rotating about the bearings 66 when the row cleaner encounters an obstacle. The second linkage 102 can be of an excess length so that when the row cleaner and furrow opener are on the ground, the linkage 102 is in a slack condition. This permits the row cleaner to follow a depression in the ground.

In order to bring the grain drill assembly 10 into a non-operating condition, that is, to raise the grain drill 16 from the ground, the servomotor 24 is retracted, so that the rockshaft 14 rotates clockwise about the pivot axis A. During this movement, the travel limiter 54 carries along with it the support arm 32 and thereby raises the furrow opener 34, the drill coulter 36 and the closing wheels 38. Since the attaching mount 30 also rotates clockwise about the pivot axis A, the first linkage 100 is moved upward and pivots the shaft 94 through the input crank arm 96. The shaft 94 moves the output crank arm 98 and carries the linkage 102 along with it. The linkage 102 moves the first steering arm 58 upward, rotating it in the clockwise direction. The rotation of the linkage 102 lifts the row cleaner 20 and also moves the row cleaner relative to the grain drill support arm 32. The amount of the relative movement results from the location of the connecting joints of the first and the second linkages 100, 102. If the linkage 102 is in a slack condition when the row cleaner is on the ground, the furrow opener will lift first before the row cleaner begins to lift. This can provide additional clearance for the row cleaner to be lifted.

As long as the operating conditions permit it, in the raised position, in which the parallelogram linkage is collapsed, the bracket 72 can be brought into engagement with the pin 80 and thereby prevent the row cleaner 20 from lowering to the ground when the grain drill 16 is again lowered. The row cleaner 20 can thus be retained in a raised position during transport as well as during the use of the grain drill assembly 10 when the row cleaner is not needed.

The invention should not be limited to the above-described embodiment, but should be limited solely by the claims that follow.

What is claimed is:

1. A seeding machine comprising:
   a frame;
   a rockshaft rotatable about an axis transverse to a forward direction of operation of the seeding machine;
   a furrow opener mounted to the rockshaft to pivot vertically;
   a row cleaner attached to the furrow opener to pivot vertically;
   a lifting mechanism on the frame and coupled to the furrow opener by a first linkage and to the row cleaner by a second linkage wherein the row cleaner is lifted in response to lifting of the furrow opener.

2. The seeding machine as defined by claim 1 wherein the lifting mechanism is a bell crank having a rotating shaft coupled to the frame and first and second crank arms fixed to the rotating shaft and coupled to the first and second linkages respectively.

3. The seeding machine as defined by claim 2 wherein the first and second crank arms are of different lengths.

4. The seeding machine as defined by claim 1 wherein the second linkage is flexible, carrying only tensile loads, whereby lifting of the row cleaner is not operable to actuate the lifting mechanism.

5. The seeding machine as defined by claim 4 wherein the second linkage is selected from the group of chain, rope, and telescoping linkage.

6. The seeding machine as defined by claim 4 wherein the second linkage provides for lost rotational motion allowing the furrow opener to raise a predetermined amount before the lifting mechanism begins lifting of the row cleaner.

7. The seeding machine as defined by claim 1 wherein the first linkage is coupled to the rockshaft to actuate the lifting mechanism only when the furrow opener is raised by rotation of the rockshaft.

8. The seeding machine as defined by claim 1 wherein the row cleaner is mounted to a support arm of the furrow opener by a parallelogram linkage.

9. The seeding machine as defined by claim 8 further comprising a lock to fix the parallelogram linkage in place when the row cleaner is raised.

10. The seeding machine as defined by claim 9 wherein the lock includes a bracket on one member of the parallelogram linkage that is selectively coupled to another member of the parallelogram linkage to fix the parallelogram linkage in place.

11. A seeding machine comprising:
    a frame;
    a rockshaft rotatable about an axis transverse to a forward direction of operation of the seeding machine;
    a furrow opener including a support arm mounted to the rockshaft to pivot vertically;

a row cleaner attached to the support arm of the furrow opener by a parallelogram linkage to pivot vertically; and a lock to fix the parallelogram linkage in place when the row cleaner is raised.

12. The seeding machine as defined by claim 11 wherein the lock includes a bracket on one member of the parallelogram linkage that is selectively coupled to another member of the parallelogram linkage to fix the parallelogram linkage in place.

13. A seeding machine comprising:

a frame;

a rockshaft rotatable about an axis transverse to a forward direction of operation of the seeding machine;

multiple furrow openers mounted to the rockshaft to lift the furrow openers upon rotation of the rockshaft;

multiple row cleaners with one row cleaner attached to each furrow opener to pivot vertically; and a lifting mechanism on the frame and coupled to the rockshaft by a first linkage and to the multiple row cleaners by multiple second linkages wherein the multiple row cleaners are lifted in response to lifting of the furrow openers by rotation of the rockshaft.

14. The seeding machine as defined by claim 13 wherein the lifting mechanism is a bell crank having a rotating shaft coupled to the frame, a first crank arm fixed to the rotating shaft and coupled to the first linkage and multiple second crank arms fixed to the rotating shaft and coupled to the multiple second linkages whereby the rotating shaft of the lifting mechanism rotates in response to rotation of the rockshaft thereby lifting the multiple row cleaners.

* * * * *